United States Patent [19]
Kishimoto et al.

[11] Patent Number: 5,320,916
[45] Date of Patent: Jun. 14, 1994

[54] SEPARATOR FOR ALKALI-ZINC BATTERY

[75] Inventors: Tomonori Kishimoto; Mitsuo Yamane; Takehito Bogauchi; Yoshihiro Eguchi, all of Takatsuki, Japan

[73] Assignee: Yuasa Corporation, Takatsuki, Japan

[21] Appl. No.: 920,288

[22] PCT Filed: Dec. 20, 1991

[86] PCT No.: PCT/JP91/01740
§ 371 Date: Aug. 13, 1992
§ 102(e) Date: Aug. 13, 1992

[87] PCT Pub. No.: WO92/12544
PCT Pub. Date: Jul. 23, 1992

[30] Foreign Application Priority Data

Dec. 28, 1990 [JP] Japan ................... 2-417044
Nov. 8, 1991 [JP] Japan ................... 3-292711
Dec. 9, 1991 [JP] Japan ................... 3-324325

[51] Int. Cl.[5] ............................................ H01M 2/16
[52] U.S. Cl. ........................... 429/142; 429/248
[58] Field of Search ................. 429/142, 144, 248

[56] References Cited

U.S. PATENT DOCUMENTS

| | | |
|---|---|---|
| 3,216,862 | 11/1965 | Parker et al. ............ 429/144 |
| 3,377,203 | 4/1968 | Möbius et al. . |
| 3,427,206 | 2/1969 | Scardaville et al. ......... 429/144 |
| 4,287,272 | 9/1981 | Machi et al. ............ 429/144 |
| 4,359,510 | 11/1982 | Taskier ............ 429/248 X |
| 4,804,598 | 2/1989 | Jakovitz et al. ........... 429/144 X |
| 4,957,673 | 9/1990 | Schroeder et al. ............ 264/60 |

FOREIGN PATENT DOCUMENTS

| | | |
|---|---|---|
| 0134136 | 3/1984 | European Pat. Off. . |
| 0533317 | 3/1993 | European Pat. Off. . |
| 1179852 | 10/1964 | Fed. Rep. of Germany . |
| 1375469 | 9/1964 | France . |
| 2-216757 | 8/1990 | Japan . |
| 4-34842 | 2/1992 | Japan . |
| 5-69870 | 5/1993 | Japan . |
| 5-129014 | 5/1993 | Japan . |
| 1048839 | 11/1966 | United Kingdom . |

OTHER PUBLICATIONS

Patent Abstracts of Japan vol. 13, No. 334 (M-855) (3682) 27 Jul. 1989 and JP-A-01 110 904 (Isuzu Motors Ltd) 27 Apr. 1989.

*Primary Examiner*—Stephen Kalafut
*Attorney, Agent, or Firm*—Armstrong, Westerman, Hattori, McLeland & Naughton

[57] ABSTRACT

A separator for alkali-zinc battery comprising a microporous membrane having alkali resistance, a part of the porous membrane having highly persistent hydrophillic property and the remaining part having water repellent property. In the part having hydrophillic property, precipitation of ZnO can be controlled sufficiently because of its large persistency of hydrophilic property so that dendrite short-circuiting in the battery can be prevented satisfactorily. In the part having water repellent property, $O_2$ gas is permeable well through it so that a decrease in capacity of battery can be avoided.

5 Claims, 8 Drawing Sheets

SEPARATOR FOR ALKALI-ZINC BATTERY

TECHNICAL FIELD

This invention relates to a separator for alkali-zinc battery for use in a portable equipment power source, a portable power source and an electric vehicle power source etc.

BACKGROUND ART

The alkali-zinc battery has a high energy density and a high power characteristic. Because of a high solubility of zinc, however, zinc acid ions existing in electrolyte at the time of charging have deposited on an anode in dendrite form or spongy form, a short-circuiting piercing through the separator has taken place, or a shape change has occurred to minimize utilization factor; so that a cycle life of a battery has been short.

A micro-porous membrane comprising polypropylene, polyethylene etc. subjected only to surface active agent treatment has been used for a conventional separator for alkali-zinc battery. Such a separator has a desirable property for use in a sealed-type battery in which $O_2$ gas is absorbed by a zinc electrode, because $O_2$ gas is permeable through it. However, since it is subjected only to the surface active agent treatment, its hydrophilic property is weakened while it is immersed in electrolyte. Further, a mechanism wherein ZnO is gradually precipitated in micro-pores to bring about short-circuiting, i.e. a dendrite short-circuiting, can not be avoided sufficiently so that it is not suitable for an application requiring a long-term storage or a charge/-discharge cycle life of a long period.

In order to improve the above disadvantages, there has been used a separator fabricated by a semi-permeable membrane and a micro-porous membrane placed one upon another. However, the permeability of $O_2$ gas can not be expected in these membranes.

Disclosure of the Invention

An object of this invention is to provide a separator for alkali-zinc battery, which has both properties of a semi-permeable membrane and a micro-porous membrane so that a dendrite short-circuiting can be avoided sufficiently and a decease in battery capacity can be controlled by making $O_2$ gas to be permeable well.

This invention provides a separator for alkali-zinc battery comprising a micro-porous membrane having alkali resistance, a part of the porous membrane having a high hydrophilic property and the remainder having a water repellent property.

According to this invention, the precipitation of ZnO is sufficiently controlled in the part having the hydrophilic property because this hydrophilic property is highly durable. Consequently, the dendrite short-circuiting in battery can be avoided sufficiently. In the part having the water repellent property, $O_2$ gas is highly permeable. Consequently, the decrease in battery capacity can be controlled.

BEST MODE FOR CARRYING OUT THE INVENTION

Embodiment 1

Figure 1:
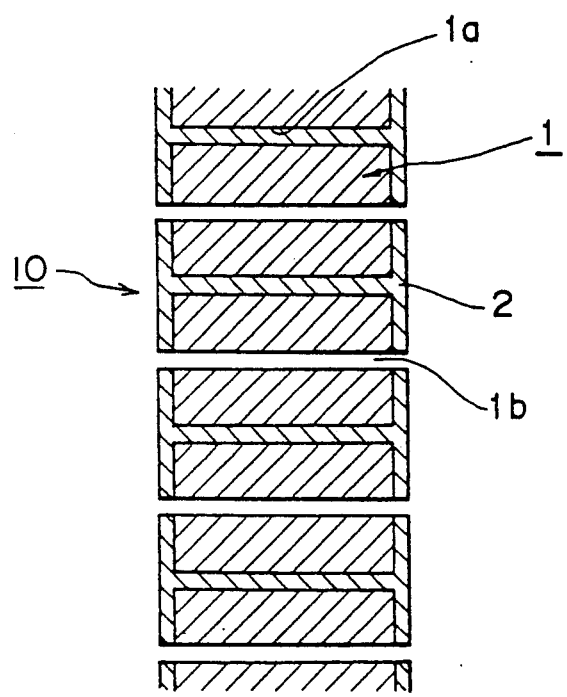
FIG. 1 is a vertical sectional partial view showing a separator of embodiment 1 of this invention.

FIG. 1 is the vertical sectional view showing the separator of the embodiment 1 of this invention. In FIG. 1, 1 denotes a micro-porous membrane, and a membrane having a trade name of "CELGARD #3401" (made by DAICEL CHEMICAL INDUSTRIES Ltd.) is used therefor in this figure. This is a porous membrane made of poly-propylene having a thickness of 25 microns, a porosity of 38%, and pore diameters of 0.05 through 0.125 microns. This porous membrane is subjected to surface active agent treatment. 2 denotes a cellulose which is an ion permeable resin filled in about 90% pores of the porous membrane 1. 1a denotes pores in which the cellulose is filled, and 1b denotes about 10% remaining pores in which the cellulose is not filled. The pores 1b are uniformly distributed over a surface fronting on a plate surface. The pore 1b is provided with water repellent property by removing the surface active agent. In order to fill the cellulose 2, viscose is applied on an about 90% area of surface of the porous membrane 1 and impregnated under reduced pressure to be solidified. As described above, the pores 1a are filled with the cellulose and the pores 1b are provided with the water repellent property, so that a separator 10 is composed.

A property of the separator 10 thus constructed was investigated as follows. A battery A using the separator 10, a battery B using a separator comprising a simple micro-porous membrane made of polypropylene, and a battery C using a separator comprising a simple micro-porous membrane made of polypropylene and a cellophane forming a semi-permeable membrane, were prepared each two cells, respectively. Electrodes, containers and electrolyte composing the batteries were the same for all of them. Namely, a zinc electrode forming an anode was fabricated in such a manner that a punched copper current collector on which a number of pores were made was used as a core metal, and zinc active material sheets were pressure crimped on both faces of the core metal. A nickel electrode forming a cathode was fabricated in such a manner that an active material having a principal component of nickel hydroxide was filled in a sintered nickel plaque by means of the chemical impregnation method. Non woven fabric made of polypropylene was used for the container. The electrolyte was KOH solution having a specific gravity of 1.35. A nominal capacity of battery was 10Ah.

Changes in capacities of the above batteries A, B and C were investigated by repeating charge and discharge operations under the following conditions. The discharge was conducted at 2A until a voltage per cell reached 1V. The charge was conducted at 1A up to a charge capacity corresponding to 105% of a discharge capacity. Open circuit voltages of the above batteries A, B and C were 1.70V, voltages at 50% discharge were 1.65V. Results are shown in FIG. 2.

Figure 2:
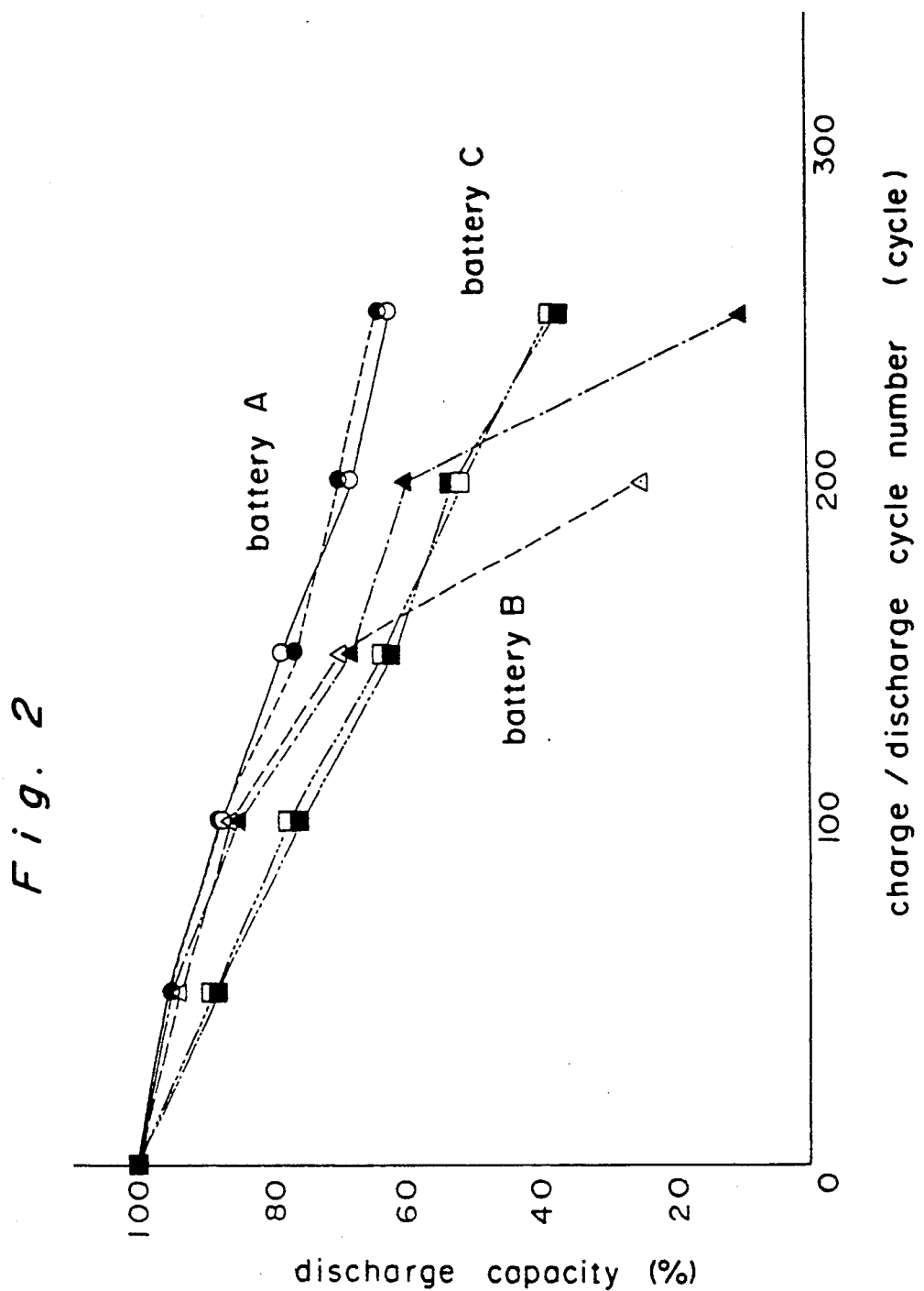
FIG. 2 is a diagram showing cycle life characteristics of batteries using separators of embodiments 1, 2 and 3 of this invention and a battery using a conventional separator.

As seen from FIG. 2, a decrease in discharge capacity is small in the battery A even when the cycle is repeated. In the battery B, the gas absorption is executed well and the decrease in capacity is approximately equal to that of the battery A because it consists of the polypropylene micro-porous membrane. However, the capacity abruptly decreases caused by the short-circuiting due to the dendrite of zinc because it is porous. In the battery C, the gas absorption is hard to be executed to cause the decrease in capacity because the cellophane is used.

In case of the separator 10 as described above, the cellulose is filled in the pores 1a, so that it has an excellent persistency in ion permeability as compared with a separator subjected only to the surface active agent treatment, ZnO is prevented from precipitating in the pores 1a so as to avoid the dendrite short-circuiting sufficiently. Since the pores 1b are provided with the water repellent property, $O_2$ gas is well permeable so as to control the decrease in battery capacity. Further, the pores 1b are uniformly distributed over the surface fronting on the plate surface, so that O2 gas is absorbed uniformly and a change in shape of anode is minimized. Accordingly, a battery having an excellent cycle life can be provided by the separator 10.

Figure 3:
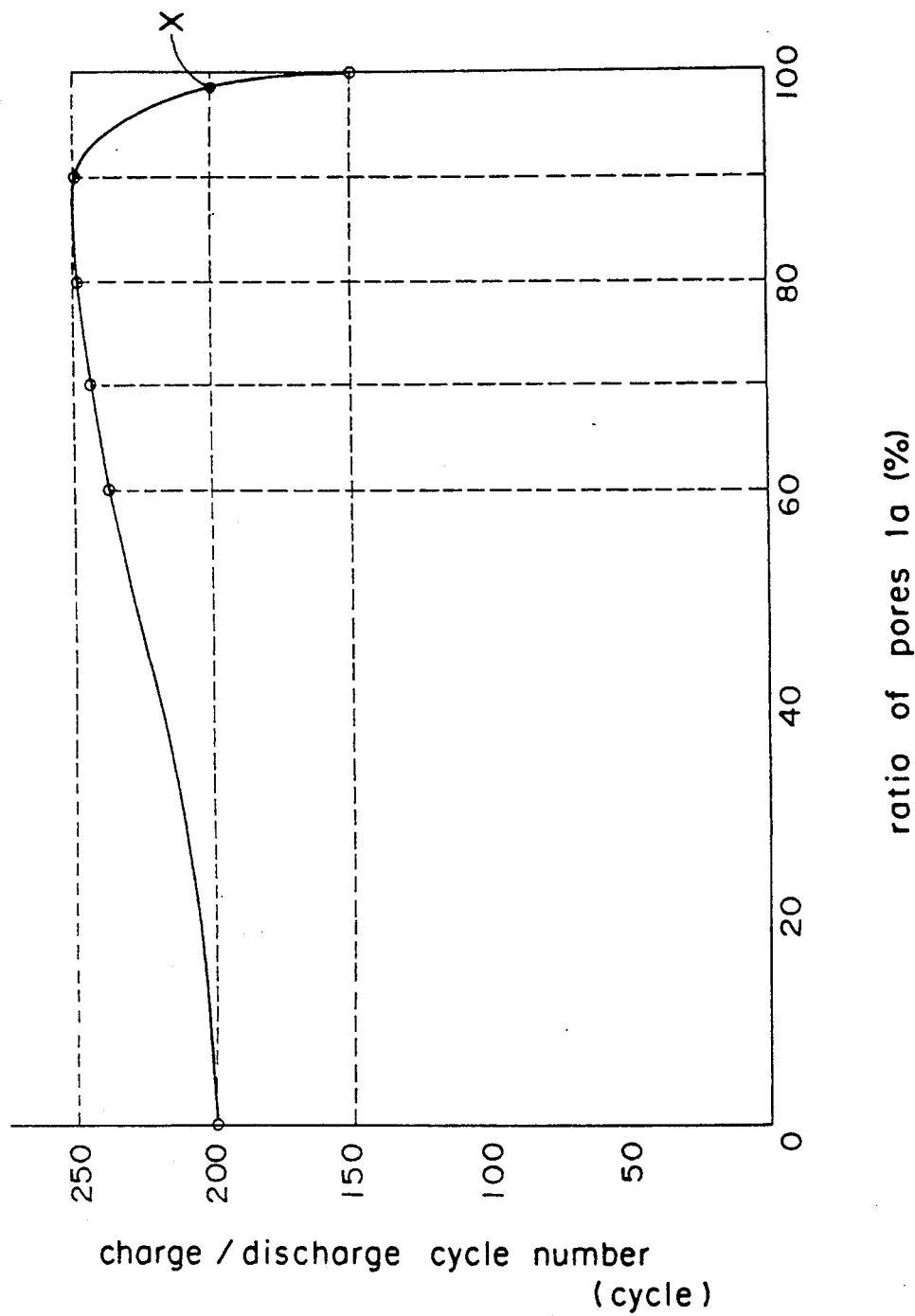
FIG. 3 is a diagram showing a change in charge/discharge cycle number in case a when a ratio of pores filled with ion permeable resin to the entire pores is changed.

The percentage of the pores 1a filled with cellulose to the total pores is about 90% in the separator 10 used for the battery A, however, this percentage is not limited to this value. FIG. 3 is the diagram showing the change in charge/discharge cycle number in case when a ratio of pores 1a to the total pores in separator 10 is changed. The axis of abscissa denotes the percentage of pores 1a and the axis of ordinate denotes the charge/discharge cycle number. According to this diagram, even when the percentage of pores 1a is extremely small, the cycle number increases if any pores filled with cellulose exist. However, in the event when the pores 1a occupy approximately the entire part i.e. the percentage exceeds a point X (about 98%), the cycle life decreases because $O_2$ gas absorption becomes insufficient due to an excessively small quantity of pore 1b. Consequently, it is enough to set the percentage of pores 1a to a value larger than zero and smaller than the point X, so that the percentage is not limited to about 90%. However, the percentage is preferably set to about 90% because the peak of cycle life exists at about 90%.

In place of the membrane made of polypropylene, those made of polyethylene and nylon etc. may be used for the microporous membrane. Further, in place of cellulose, poval (polyvinyl alcohol) etc. may be used for the ion permeable resin.

As describe above, the present embodiment is able to provide the separator for alkali-zinc battery which can prevent the dendrite short-circuiting satisfactorily and can control the decrease in battery capacity by allowing $O_2$ gas to be permeable well. Therefore, the separator of this embodiment is able to provide the alkali-zinc battery having an excellent charge/discharge cycle life so that its industrial value is extremely large.

Embodiment 2

Figure 4:
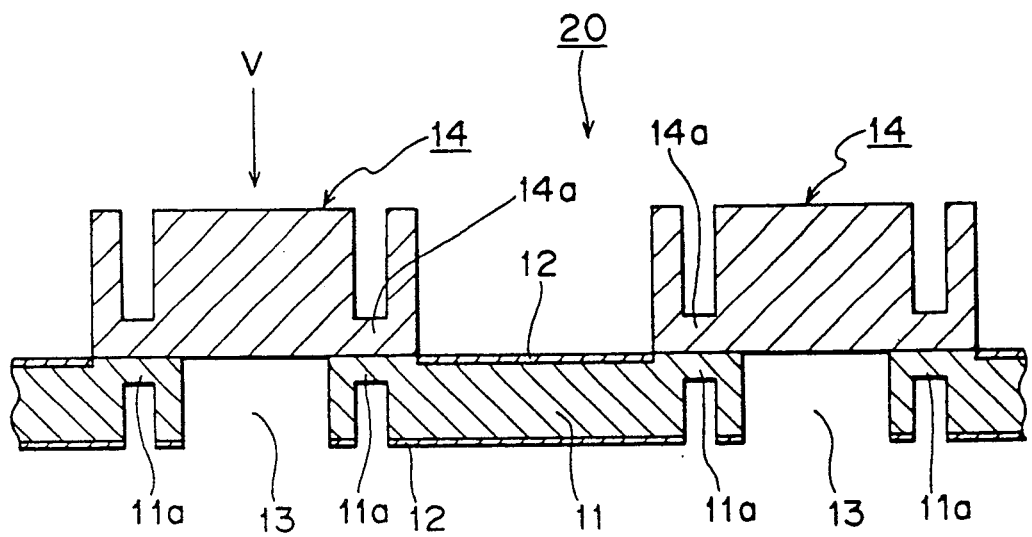
FIG. 4 is a vertical sectional partial view showing the separator of the embodiment 2 of this invention.
Figure 5:
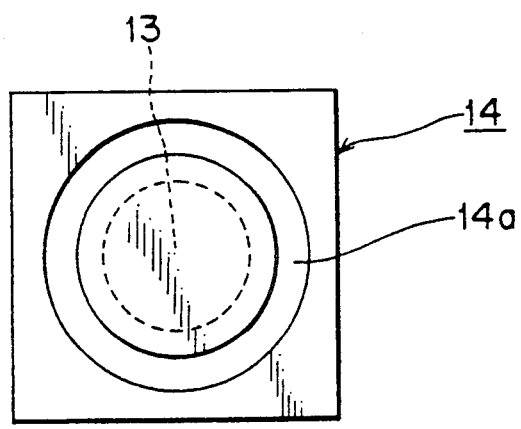
FIG. 5 is a view viewed in a direction of arrow V of FIG. 4.

FIG. 4 is the vertical sectional partial view showing the separator of the embodiment 2 of this invention. FIG. 5 is the view viewed in the direction of arrow V of FIG. 4. In the figures, 11 denotes a first layer forming the micro-porous membrane composed of two sheets placed one upon another having trade name of "CELGARD #3401" (made by DAICEL CHEMICAL INDUSTRIES Ltd.). The "CELGARD #3401" is similar to that of the embodiment 1. A thickness of the first layer 11 is 50 microns. The first layer 11 is subjected to the surface active agent treatment. 12 denotes a cellulose forming an ion permeable resin coated on the entire surface of the first layer 11. Although not shown in the figure, micro-pores of the first layer 11 are filled with the cellulose 12. Viscose is applied on the entire surface of the first layer 11 and impregnated under reduced pressure so as to be solidified, and the cellulose 12 can thus be applied. 13 denotes a through hole having a circular section formed on the first layer 11. Many through holes 13 are made on the layer.

14 denotes a second layer forming a micro-porous membrane, and a sheet having trade name of "HIPORE 2100" (made by ASAHI CHEMICAL INDUSTRY Co., Ltd.) is used therefor. The "HIPORE 2100" is a porous membrane made of polyethylene. A thickness of the second layer 14 is 100 microns. The second layer 14 is not subjected to the surface active agent treatment. Namely, the second layer 14 has water repellent property. The second layer 14 has a flat square shape, and is stuck at portion 14a by means of melting adhesion with heat or ultra-sonic wave to a portion 11a of a surface of the first layer 11 so as to cover the through hole 13. An area of one second layer 14 is set to under 20 mm$^2$ incl., and a second layer 14 having a side length of 4 mm is used in this case. A diameter of the through hole 13 is set to 3 mm. One second layer 14 covers one through hole 13, and the entire second layer 14 is uniformly formed and distributed to occupy an area of under 20% incl. of a surface fronting on the plate surface. Namely, the through hole 13 is previously formed in consideration that the second layer 14 can be distributed in the above-mentioned manner.

A property of the separator 20 thus constructed was investigated in the same way as the embodiment 1. That is, a battery A constructed in the same way as the embodiment 1 using the separator 20, and a battery B and Battery C similar to those used in the embodiment 1 were prepared, charge/discharge operations were repeated in the same conditions as the embodiment 1, thus the changes in capacity was investigated. The results were the same as FIG. 2. Namely, the decrease in capacity was small in case of the battery A even when the cycle was repeated.

As described above, since the cellulose 12 (ion permeable resin) is applied over the entire surface of the first layer 11 in case of the separator 20, its persistency of ion permeability is excellent as compared with that subjected only to the surface active agent treatment. Accordingly, in a part of the first layer 11 to which the second layer 14 is not stuck, the precipitation of ZnO is controlled so that the dendrite short-circuiting in battery can be avoided satisfactorily. On the other hand, the second layer 14 has the water repellent property because it is not subjected to the surface active agent treatment. For this reason, in a part to which the second layer 14 is stuck, $O_2$ gas is well permeable through the second layer 14 and the through holes 13 so that the decrease in capacity of battery can be controlled. In addition, $O_2$ gas is absorbed uniformly and the shape change of anode is minimized because the second layer 14 is uniformly distributed on the surface fronting on the plate surface. Accordingly, a battery having an excellent cycle life can be provided by using the separator 20. In the event when an area of one second layer 14 is larger than 20 mm$^2$ and/or when a percentage of an area occupied by the entire second layer 14 to that fronting on the plate surface is larger than 20%, an effective area of the zinc electrode is minimized so that these cases are not preferable.

The second layer 14 is provided only on one surface in the separator 20 thus constructed, however, it may be provided on both surface.

Figure 6:
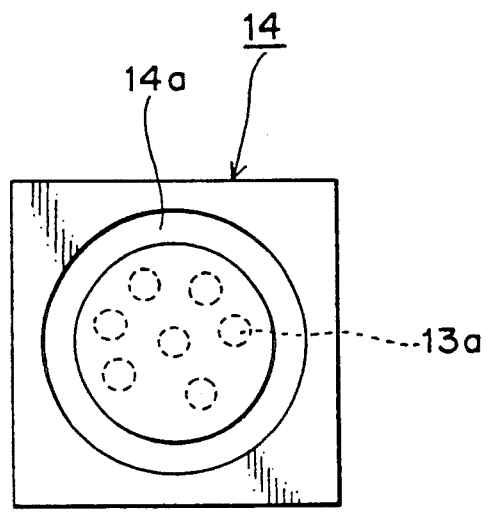
FIG. 6 is a plan view showing another example of the embodiment 2.
Figure 7:
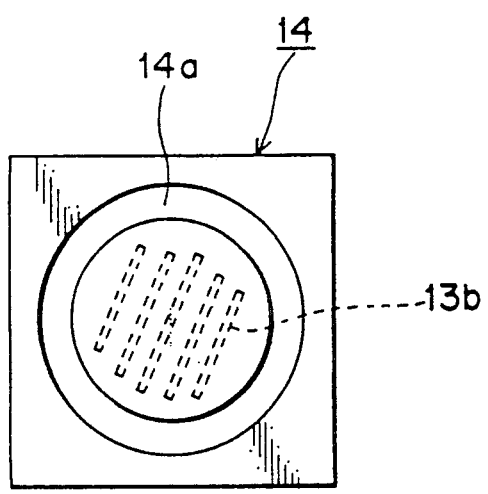
FIG. 7 is a plan view showing a further another example of the embodiment 2.

The through hole covered by one second layer 14 is formed into one circular sectional shape in the separator 20 thus constructed, however, it is not limited to that shape. The through hole may be formed into plural holes 13a having circular sectional shapes as shown by FIG. 6 or into plural holes 13b having slit shapes as shown by FIG. 7. Naturally, it is not necessarily limited to the circular sectional shape but may be polygonal shapes.

In place of the membrane made of polypropylene, those made of polyethylene and nylon etc. may be utilized as the micro-porous membrane used for the first layer 11. In place of the membrane made of polyethylene, those made of polypropylene and nylon etc. may be utilized as the micro-porous membrane used for the second layer 14. Further, in place of cellulose, poval may used for the ion permeable resin.

As describe above, the present embodiment is able to provide the separator for alkali-zinc battery which can prevent the dendrite short-circuiting satisfactorily and can control the decrease in battery capacity by allowing $O_2$ gas to be permeable well. Therefore, the separator of this embodiment can provide the alkali-zinc battery having an excellent charge/discharge cycle life so that its industrial value is extremely large.

Embodiment 3

Figure 8:
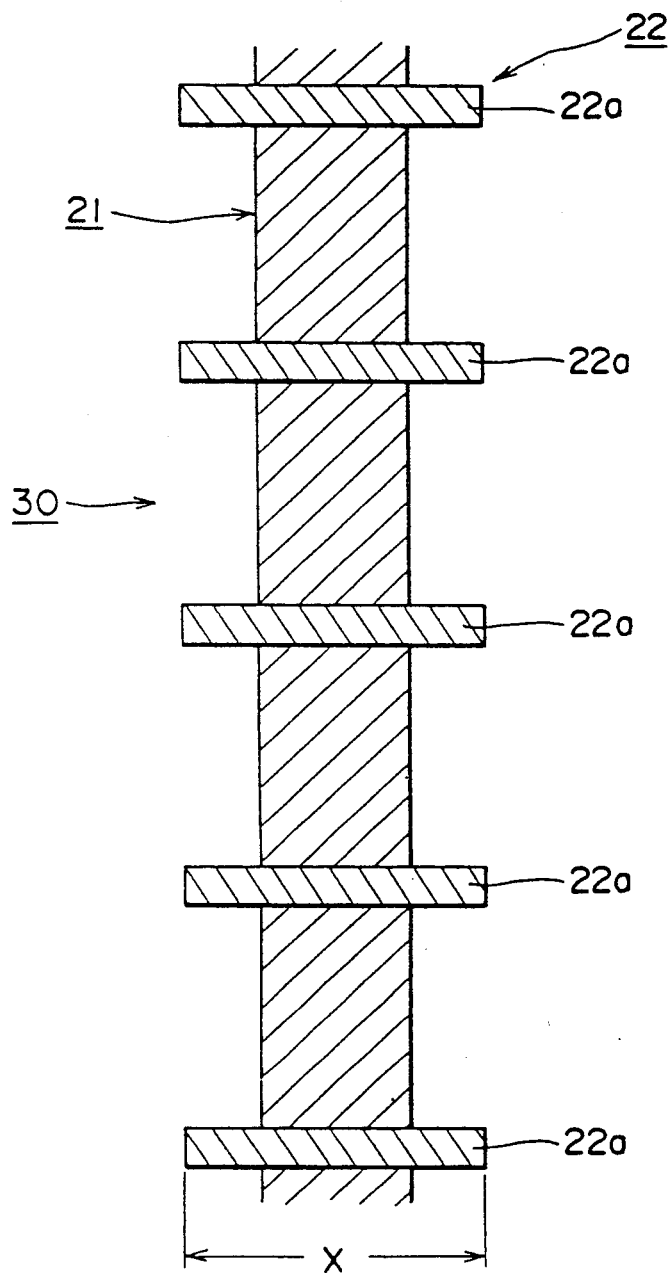
FIG. 8 is a vertical sectional partial view showing the separator of the embodiment 3 of this invention.

FIG. 8 is the vertical sectional partial view showing the separator of embodiment 3 of this invention. The separator of this embodiment is formed by using a micro-porous membrane having trade name of "CELGARD #240" (made by DAISEL Chemical Co.). The "CELGARD #2400" is a porous membrane made of polypropylene and not subjected to the surface active agent treatment, and has a thickness of 25 microns, a porosity of 38% and a max. pore diameter of 0.05 × 0.125 microns. In FIG. 8, 21 denotes a hydrophilic portion and 22 denotes a water repellent portion, and the separator of this embodiment consists of the two portions 21 and 22. The hydrophilic portion 21 is uniformly distributed so as to occupy about 90% area of a surface of the above porous membrane i.e. a surface fronting on the plate surface, and the water repellent portion 22 also consists of plural banded portions 22a uniformly distributed corresponding to the hydrophilic portion 21. The percentage of area occupied by the hydrophilic portion 21 is not limited to about 90% so far as the percentage of area occupied by the water repellent portion 22 is under 20% incl. An area of one banded portion 22a of the water repellent portion 22 is set to under 20 mm$^2$ incl.

The hydrophilic portion 21 is formed by radiation graft polymerizing a monomer acrylic acid after being subjected to heat treatment, so that it becomes thinner than an original membrane thickness X due to the heat treatment. Pores of the hydrophilic portion 21 are filled up due to the heat treatment, and its hydrophilic property is based on a hydrophilic group of acrylic acid. Monomer used may be any monomer so far as it has a hydrophilic group, and may be methacrylic or styrene sulfonic acid.

The water repellent portion 22 is formed by leaving the above porous membrane as it is. Namely, it is formed by creating the hydrophilic portion 21 on the above porous membrane surface under a state where a lead mask covering an area of the water repellent portion 22 is attached to the surface. Micro pores are left on the water repellent portion 22 as they are. A shape of the water repellent portion 22 is determined by a shape of portion covered by the mask, and the shape may be circular, polygonal or slit for instance.

A property of the separator 30 thus constructed was investigated in the same way as the embodiment 1. That is, a battery A constructed in the same way as the embodiment 1 using the separator 30, and a battery B and Battery C similar to those used in the embodiment 1 were prepared, charge/discharge operations were repeated in the same conditions as the embodiment 1, thus the changes in capacity were investigated. The results were the same as FIG. 2. Namely, the decrease in capacity was small in case of the battery A even when the cycle was repeated.

As described above, since the separator 30 includes the hydrophilic portion 21 formed by radiation graft polymerizing the monomer acrylic acid, the persistency of ion permeability is excellent as compared with that subjected only to the surface active agent treatment. Accordingly, the precipitation of ZnO is controlled in a part of the hydrophilic portion 21. Further, since micropores of the hydrophilic portion 21 are completely filled up by the heat treatment, the precipitation of ZnO can be avoided positively. Therefore, the dendrite short-circuiting in battery can be avoided satisfactorily. Moreover, the separator 30 includes the water repellent portion 22, and $O_2$ gas is well permeable through the water repellent portion 22. For this reason, the decrease in capacity of battery can be controlled. In addition, $O_2$ gas is absorbed uniformly and the shape change of anode is minimized because the water repellent portion 22 is uniformly distributed on the surface fronting on the plate surface. Accordingly, a battery having an excellent cycle life can be provided by using the separator 30. In the event when an area of one banded portion 22a of the water repellent portion 22 is larger than 20 mm$^2$ and/or when a percentage of an area occupied by the water repellent portion 22 to that fronting on the plate surface is larger than 20%, an effective area of the zinc electrode is minimized so that these cases are not preferable.

A micro-porous membrane made of polyethylene or nylon may be used in place of the micro-porous membrane made of polypropylene.

Figure 9:
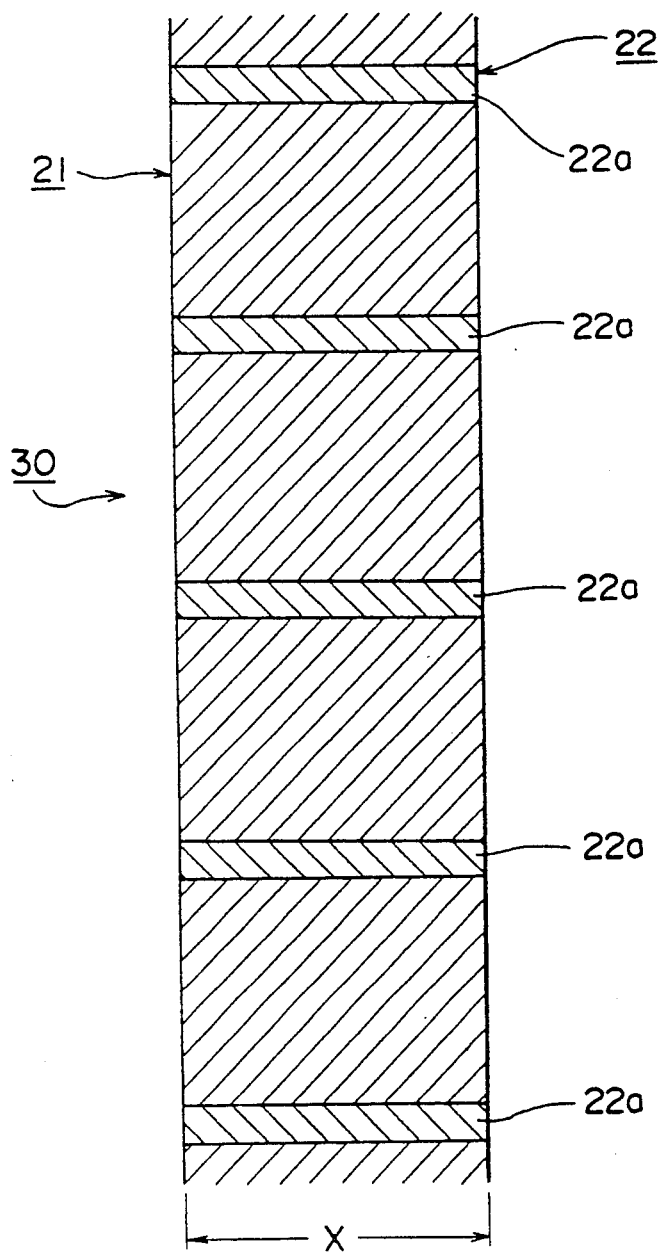
FIG. 9 is a vertical sectional partial view showing another example of the separator of the embodiment 3.
Figure 10:
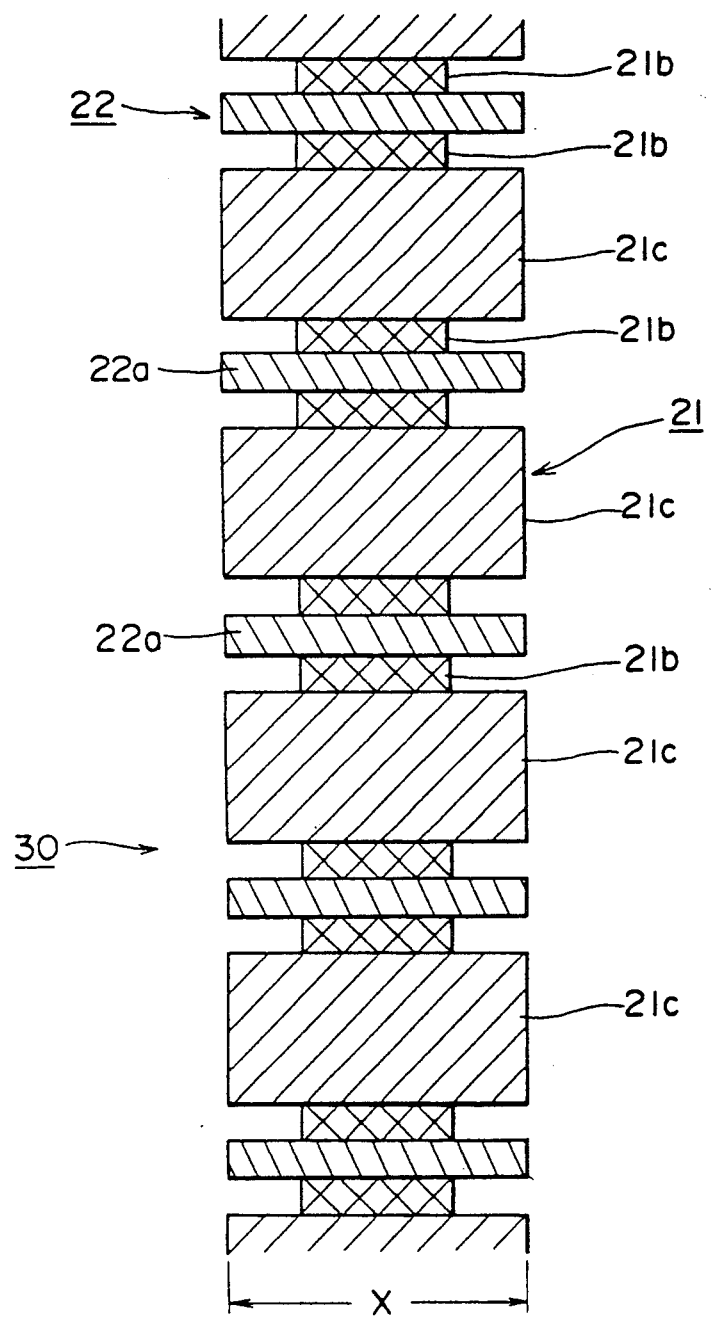
FIG. 10 is a vertical sectional view showing a further another separator of the embodiment 3 of this invention.

The entire part of the above hydrophilic portion 21 of the separator 30 thus constructed is subjected to the heat treatment, however, the heat treatment is completely negligible as shown by FIG. 9 or some part of it may be subjected to the heat treatment as shown by FIG. 10. In FIG. 9, a thickness of the hydrophilic portion 21 is not reduced as compared with an original thickness X. And in FIG. 10, the hydrophilic portion 21 is composed of a portion 21b formed by radiation graft polymerizing the monomer acrylic acid after being subjected tot he heat treatment, and a portion 21c formed by radiation graft polymerizing the monomer acrylic acid without being subjected to the heat treatment. The portion 21b is formed on a boundary between the hydrophilic portion 21 and the water repellent portion 22. The portion 21c is not subjected to the heat treatment so that it maintains the original thickness X. According to the example of FIG. 10, occurrence of the dendrite short-circuiting on the boundary between the hydrophilic portion 21 and the water repellent portion 22 can be controlled as compared with that not subjected to the heat treatment entirely.

As describe above, the present embodiment is able to provide the separator for alkali-zinc battery which can prevent the dendrite short-circuiting satisfactorily and can control the decrease in battery capacity by allowing $O_2$ gas to be permeable well. Therefore, the separator of this embodiment can provide the alkali-zinc battery having an excellent charge/discharge cycle life so that its industrial value is extremely large.

Industrial Applicability

The separator of this embodiment is able to provide the alkali-zinc battery having an excellent charge/discharge cycle life so that its industrial value is extremely large.

What is claimed is:

1. A separator for alkali-zinc battery comprising a micro-porous membrane being gas permeable and having a plurality of pores and alkali resistance, a part of pores of said porous membrane comprise a surface active agent and are filled with ion permeable resin, and the remaining pores being hydrophobic due to an absence of the surface active agent and ion permeable resin from the remaining pores.

2. A separator for an alkali-zinc battery as set forth in claim 1, in which said remaining pores are distributed uniformly over a surface fronting on a plate surface.

3. A separator for an alkali-zinc battery comprising a micro-porous membrane having a plurality of pores and alkali resistance, wherein said porous membrane is composed of a first layer which is hydrophobic due to a surface active agent and ion permeable resin thereon and comprising through holes on a part thereof, and a second layer being hydrophobic and attached by means of melting adhesion to the first layer so as to cover said through holes.

4. A separator for an alkali-zinc battery as set forth in claim 3, in which said second layer comprises a plurality of second layer portions each covering a respective through hole and having an area of under 20 $mm^2$ and the entire second layer is uniformly distributed to occupy an area of under 20% of a surface fronting on a plate surface.

5. A separator for an alkali-zinc battery as set forth in claim 3, in which each said through hole is composed of one or plurality holes formed into circular, polygonal or slit shape.

* * * * *